UNITED STATES PATENT OFFICE.

OTTO SCHÜTZ AND GEORG DALLMANN, OF GUMMERSBACH, GERMANY.

PROCESS OF PRODUCING QUINATE OF UREA.

SPECIFICATION forming part of Letters Patent No. 690,080, dated December 31, 1901.

Application filed June 11, 1901. Serial No. 64,189. (No specimens.)

*To all whom it may concern:*

Be it known that we, OTTO SCHÜTZ and GEORG DALLMANN, subjects of the Emperor of Germany, residing at Gummersbach, German Empire, have invented a new and useful Process of Producing Quinate of Urea, of which the following is a specification.

A salt of quinic acid with urea was until now unknown. It has been previously thought that a union of quinic acid and urea was impossible. The present invention, however, presents a process the use of which results in such a union.

One molecule of quinic acid and two molecules of urea are each individually dissolved in the necessary amount of water or diluted alcohol and the two solutions then united. Care must be taken in mixing the two solutions aforesaid that a temperature below 65° to 70° C. is maintained, inasmuch as by a higher temperature the urea is decomposed in carbon dioxid and ammonia. The solution thus obtained is then heated under pressure and reduced to about one-half of the atmospheric pressure and under a temperature of 50° to 55° C. until it is reduced to a thickly liquid condition. By cooling this resultant large prismatic crystals of quinate of urea are formed which are similar to quinic acid. The salt has an acid reaction, consists of one molecule of quinic acid and two molecules of urea, and is readily soluble in water and alcohol. Its melting temperature is 106° to 107° C., and it decomposes when submitted to a temperature above the melting-point, the urea being split into carbon dioxid and ammonia.

As an example the following method of working may be described: One hundred and ninety-two grams quinic acid is dissolved in four hundred cubic centimeters of water, and one hundred and twenty grams urea is dissolved in one hundred and fifty cubic centimeters of water, and the two solutions are mixed together at a temperature of 70° C. This solution is then reduced in a vacuum to about four hundred and fifty grams. When cooled and allowed to stand for some time, the quinate of urea is precipitated in crystal form. The lye can be used in the next operation.

The quinate of urea serves for therapeutic purposes.

The remedy is used in cases of uric diathesis in a dose of about ten grams for every day.

Having now particularly described our invention, we claim as new and desire to protect by Letters Patent—

The herein-described process for producing a salt of quinic acid with urea, melting at 106° to 107° C., consisting of first uniting at a temperature below 70° C. the solutions of one molecule of quinic acid and two molecules of urea, being separately dissolved in the necessary amount of water, then mixing the solutions and finally heating the mixture under reduced pressure under a temperature of 55° C., substantially as described.

OTTO SCHÜTZ.
GEORG DALLMANN.

Witnesses:
CHARLES LESIMPLE,
KARL SCHMITT.